J. Q. DEAL.
CLOTHES POUNDER.
APPLICATION FILED JAN. 30, 1909.
923,414.
Patented June 1, 1909.
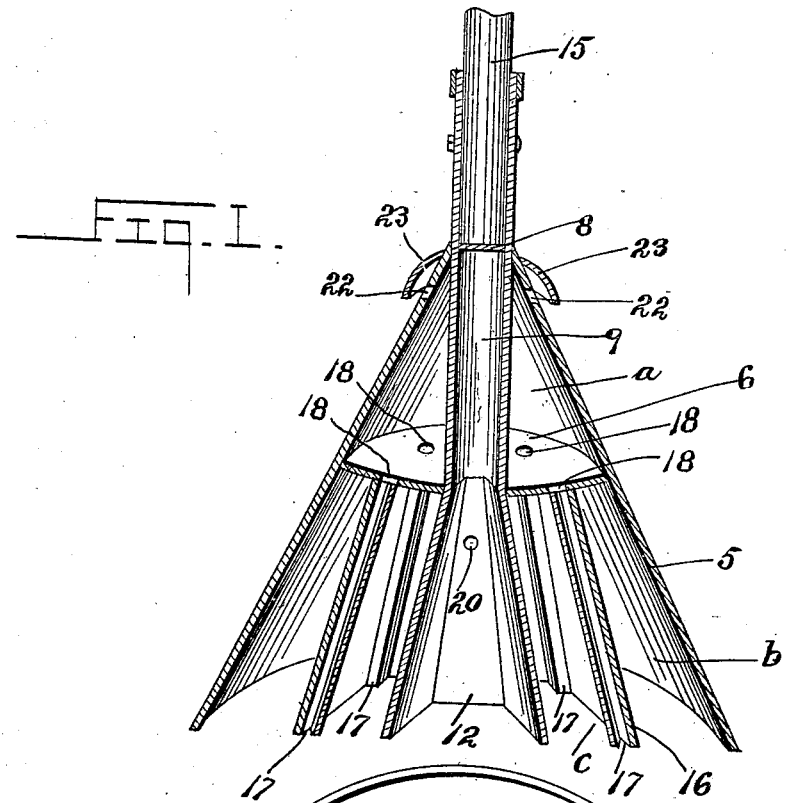
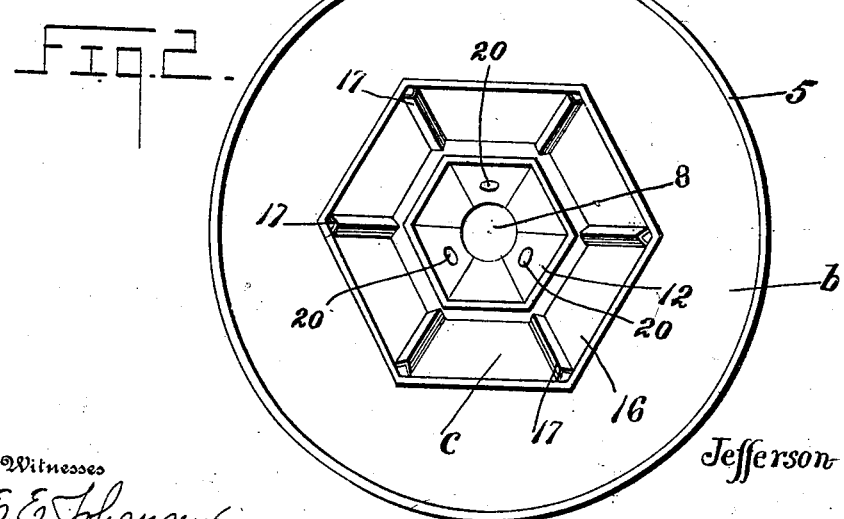
Witnesses
E. E. Johansen
E. L. Chandler
Inventor
Jefferson Q. Deal.
By Woodward & Chandler
Attorney

UNITED STATES PATENT OFFICE.

JEFFERSON Q. DEAL, OF WINFIELD, KANSAS.

CLOTHES-POUNDER.

No. 923,414.  Specification of Letters Patent.  Patented June 1, 1909.

Application filed January 30, 1909. Serial No. 475,146.

*To all whom it may concern:*

Be it known that I, JEFFERSON Q. DEAL, a citizen of the United States, residing at Winfield, in the county of Cowley and State of Kansas, have invented certain new and useful Improvements in Clothes-Pounders, of which the following is a specification.

This invention relates to certain new and useful improvements in laundry appliances, and relates more particularly to that class of devices known as clothes pounders.

The object of my invention is to provide a light, readily operated and inexpensive device adapted to be used in washing clothes.

By means of my invention, air is applied as an active agent in forcing the detergent through the fabrics to be cleaned.

Other objects and advantages will be apparent from the following description, and it will be understood that changes in the specific structure shown and described may be made within the scope of the claims without departing from the spirit of the invention.

In the drawings forming a portion of this specification, and in which like characters of reference indicate similar parts in the several views, Figure 1 is a vertical sectional view of the apparatus, Fig. 2 is a bottom view thereof.

In carrying out the object of my invention, I employ a tube 9. This tube near one end is provided with the diaphragm 8 which serves as a stop for the end of the handle 15. At the opposite end, this tube 9 is provided with a flaring hexagonal casing 12, as clearly disclosed in Fig. 1.

Surrounding the tube 9 and extending from near the upper end thereof, is the conical outer casing 5, the lower edge of which ends in the same plane as that defining the end of the hexagonal casing 12. This conical casing 5 is approximately twice the length of the hexagonal casing 12.

A dished drum 6 surrounds the tube 9 and has its circumferential edge secured to the casing 5 as disclosed. This drum divides the casing 5 into an upper air chamber $a$ and a lower air chamber $b$. Held within this lower air chamber $b$ is a flaring hexagonal-shaped shell or casing 16 the lower edge of which ends in alinement with the lower edges of the conical casing 5 and the hexagonal casing 12, as disclosed.

Within the six inner corners formed by means of the walls of the shell 16 are the air ducts 17 each of which at its upper end communicates with an opening 18 in the drum 6, the lower end of each duct 17 ending at the lower edge of the shell. By this means there will be an escape of air through the duct 17 and openings 22.

The hexagonal casing 12 at its upper end is provided preferably with three escape openings 20 so that the air within the chamber $c$ may escape into the inner chamber formed by means of this hexagonal casing 12.

The outer conical casing 5 near its upper end is provided with a number of air intake and escape openings 22 as clearly disclosed in Fig. 1.

The casing 5 is provided with a plurality of downwardly extending shields 23, one flaring over each opening 22, the lower edge of each shield ending in alinement with the lowermost point of the adjacent escape opening 22.

In the use of my clothes pounder, the fabrics to be cleaned are placed in a vessel together with a suitable detergent. The clothes pounder is then driven into the suds and suddenly withdrawn which operation insures the detergent being forced through the fabrics. The air forced within the inner chamber finds an escape through the openings 20 into the central chamber formed by means of the hexagonal-shaped casing 12. As the ducts 17 are positioned near the edge of the shell a part of this air will also escape over the lower edge into the outer chamber $b$. This construction insures a counterbalancing draft and suction which not only agitates the water but forces the detergent through the fabrics to be cleaned.

The device is light, simple and readily operated.

Having thus described my said invention, what I claim as new and desire to secure by United States Letters Patent is:

1. A clothes pounder comprising a tube which near one end carries a flaring hexagonal casing, a conical casing secured to said tube, a dished drum surrounding said tube and dividing said conical casing into an upper and lower air chamber, a hexagonal flaring shell surrounding said hexagonal casing and extending from said drum, a plurality of air ducts communicating with said upper chamber and traversing the length of said shell and ending at the bottom thereof, said hexagonal casing having escape openings near its upper end, said conical casing also having an air inlet and escape way within its upper end.

2. A clothes pounder comprising a tube which near its upper end is provided with a diaphragm and at the opposite end has a flaring hexagonal casing, a conical casing approximately twice the length of said hexagonal casing secured to said tube and ending in the same plane with said hexagonal casing, a dished drum surrounding said tube and dividing said conical casing into an upper and lower chamber, a hexagonal flaring shell surrounding said hexagonal casing and extending from said drum, a plurality of air ducts communicating with said upper chamber and traversing the length of said shell and ending at the bottom thereof, said hexagonal casing having an escape opening near its upper end, said conical casing also having air inlets and escape ways within its upper end, and a shield flaring over each of said air inlet openings.

In testimony whereof I affix my signature, in presence of two witnesses.

JEFFERSON Q. DEAL.

Witnesses:
  W. G. GRAHAM,
  O. H. REYNOLDS.